United States Patent
Du et al.

(10) Patent No.: US 10,601,027 B2
(45) Date of Patent: Mar. 24, 2020

(54) MANUFACTURING OF THICK COMPOSITE ELECTRODE USING SOLVENT MIXTURES

(71) Applicant: UT-BATTELLE, LLC, Oak Ridge, TN (US)

(72) Inventors: Zhijia Du, Knoxville, TN (US); Claus Daniel, Knoxville, TN (US); Jianlin Li, Knoxville, TN (US); David L. Wood, III, Knoxville, TN (US)

(73) Assignee: UT-BATTELLE, LLC, Oak Ridge, TN (US)

( * ) Notice: Subject to any disclaimer, the term of this patent is extended or adjusted under 35 U.S.C. 154(b) by 5 days.

(21) Appl. No.: 15/965,242

(22) Filed: Apr. 27, 2018

(65) Prior Publication Data

US 2018/0315992 A1    Nov. 1, 2018

Related U.S. Application Data

(60) Provisional application No. 62/492,475, filed on May 1, 2017.

(51) Int. Cl.

| | |
|---|---|
| *H01M 4/04* | (2006.01) |
| *H01M 4/1391* | (2010.01) |
| *H01M 4/36* | (2006.01) |
| *H01M 4/62* | (2006.01) |
| *H01M 4/02* | (2006.01) |

(52) U.S. Cl.
CPC ....... *H01M 4/0404* (2013.01); *H01M 4/1391* (2013.01); *H01M 4/364* (2013.01); *H01M 4/62* (2013.01); *H01M 4/621* (2013.01); *H01M 4/622* (2013.01); *H01M 2004/027* (2013.01); *H01M 2004/028* (2013.01)

(58) Field of Classification Search
None
See application file for complete search history.

(56) References Cited

U.S. PATENT DOCUMENTS

| | | |
|---|---|---|
| 8,956,688 B2 | 2/2015 | Li et al. |
| 9,685,652 B2 | 6/2017 | Li et al. |
| 2013/0108776 A1* | 5/2013 | Li .................... H01M 4/0404 427/8 |

OTHER PUBLICATIONS

Du et al.: "Enabling Aqueous Processing for Crack-free Thick Electrodes", Journal of Power Sources, vol. 354, (Jun. 30, 2017) 200-206.
Kenneth A. Connors and James L. Wright, "Dependence of surface tension on composition of binary aqueous-organic solutions", Analytical Chemistry 1989 61 (3), 194-198.
Daniel B. Pourreau,"Solving Solvent Challenges", Coatings Magazine, Jul./Aug. 2007.

(Continued)

*Primary Examiner* — Sarah A. Slifka
(74) *Attorney, Agent, or Firm* — Fox Rothschild LLP

(57) ABSTRACT

A method of making an electrode includes the step of dispersing an active electrode material and a conductive additive in a solvent to create a mixed dispersion. The solvent has a surface tension less than 40 mN/m and an ozone forming potential of no more than 1.5 lbs. ozone/lb. solvent. A surface of a current collector is treated to raise the surface energy of the surface to at least the surface tension of the solvent or the mixed dispersion. The dispersed active electrode material and conductive additive are deposited on the current collector. The coated surface is heated to remove solvent from the coating.

31 Claims, 11 Drawing Sheets

(56) References Cited

OTHER PUBLICATIONS

M.R. Palacin, Chem. Soc. Rev., 38 (2009) 2565.
S.-L. Wu, W. Zhang, X. Song, A. K. Shukla, G. Liu, V. Battaglia, and V. Srinivasan, J., Electrochem. Soc., 159 (2012) A438.
K.G. Gallagher, S.E. Trask, C. Bauer, T. Woehrle, S.F. Lux, M. Tschech, P. Lamp, B.J. Polzin, S. Ha, B. Long, Q. Wu, W. Lu, D.W. Dees, and A.N. Jansen, J Electrochem. Soc., 163 (2016) A138.
N. Loeffler, J. Von Zamory, N. Laszczynski, I. Doberdo, G.T. Kim, and S. Passerini, J., Power Sources, 248 (2014) 915.
J. Li, R. Klopsch, S. Nowak, M. Kunze, M. Winter, and S. Passerini, J. Power Sources, 196 (2011) 7687.
J. Xu, S.-L. Chou, Q. Gu, H.-K. Liu, and S.-X. Dou, J Power Sources, 225 (2013) 172.
J. Li, C. Daniel, S. J. An, and D.L. Wood. Evaluation Residual Moisture in Lithium-Ion Battery Electrodes and Its Effect on Electrode Performance.
H. Zhong, M. Sun, Y. Li, J. He, J. Yang, and L. Zhang, J Solid State Electrochem., 20 (2016).
Z. Du, C. J. Janke, J. Li, C. Daniel, and D. L. Wood, J Electrochem. Soc., 163 (2016) A2776.
D.L. Wood, J. Li and C. Daniel, J. Power Sources, 275 (2015) 234.
H. Shin and J. C. Santamarina, Geotechnique, 61 (2011) 961.
P. D. Hallett and T. A. Newson, European Journal of Soil Science, 56 (2005) 31.
P. Lura, B. Pease, G. B. Mazzotta, F. Rajabipour, and J. Weiss, ACI Mater. 1, 104 (2007) 187.
R. C. Chiu, T. J. Garino, and M. J. Cima, J. Am. Ceram. Soc., 76 (1993) 2257.
R. C. Chiu and M. J. Cima, J. Am. Ceram. Soc., 76 (1993) 2769.
K. B. Singh and M. S. Tirumkudulu, Phys. Rev. Lett., 98 (2007) 218302.
F. Routh and W. B. Russel, AIChE 1, 44 (9) (1998) 2088.
F. Routh and W. B. Russel, Langmuir, 15 (1999) 7762.
Peterson, C. Heldmann, and D. Johannsmann, Langmuir, 15 (1999) 7745.
J. Martinez and J. A. Lewis, Langmuir, 18 (2002) 4689.
M. S. Tirumkudulu and W. B. Russel, Langmuir, 20 (2004) 2947.
V. Slowik, T. Hilbner, M. Schmidt and B. Villmann, Cem. Concr. Compos., 31 (2009) 461.
V. Slowik and J.W. Ju, Cem. Concr. Compos., 33 (2011) 925.
R. Dufresne, E. I. Corwin, N. A. Greenblatt, J. Ashmore, D. Y. Wang, A. D. Dinsmore, J. X. Cheng, X. S. Xie, J. W. Hutchinson, and D. A.Weitz, Phys. Rev. Lett., 81 (2003) 4501.
W. Man and W. B. Russel, Phys. Rev. Lett., 100 (2008) 198302.
Du, Zhijia, et al. "Understanding limiting factors in thick electrode performance as applied to high energy density Li-ion batteries." Journal of Applied Electrochemistry 47.3 (2017): 405-415.
P. Abraham, D. W. Dees, J. Christophersen, C. Ho, and A. N. Jansen, Int. J. Energy Res., 34 (2010) 190.
W. J. Cheong and P. W.Carr, J. Liq. Chromatog., 10 (1987) 561.
Vhquez, E. Alvarez, and J. M. Navaza, J Chem. Eng. Data, 40 (1995) 611.
D. Pourreau, G. Kelly, L. Junker, R. Wojcik, S. Goldstein, M. MorganFormulating VOC-compliant coatings with exempt solvents. Paint Coat. Ind., 15 (11) (1999), pp. 84-100.
Smekens, Jelle, Rahul Gopalakrishnan, Nils Van den Steen, Noshin Omar, Omar Hegazy, Annick Hubin, and Joeri Van Mierlo. "Influence of electrode density on the performance of Li-ion batteries: experimental and simulation results." Energies 9, No. 2 (2016): 104.
S Ahmed, et al., J Power Sources 322 (2016) 169.
J. Li, C. Rulison, J. Kiggans, C. Daniel, and D. L. Wood, J. Electrochem. Soc., 159 (2012) A1152.
J. Jung, J. Jang, O.B. Chae, T. Yoon, J. H. Ryu, and S. M. Oh, J. Power Sources, 287 (2015) 359.
X. Zhang, W. J. Jiang, X. P. Zhu, A. Mauger, Qilu, C. M. Julien, J. Power Sources, 196 (2011) 5102.

\* cited by examiner

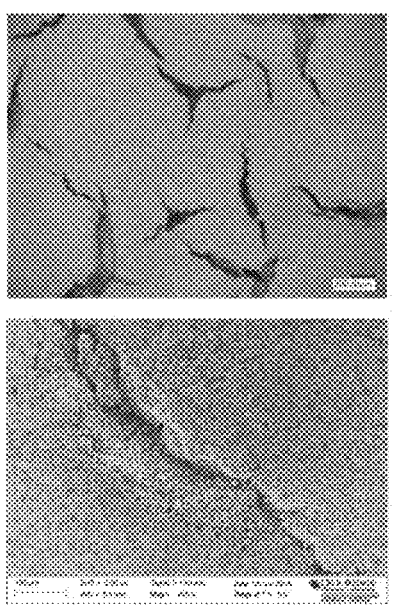
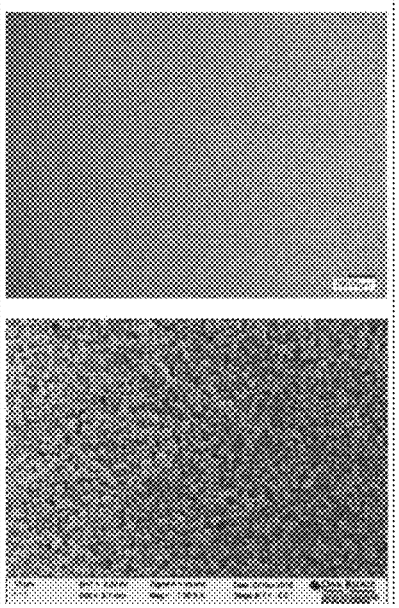
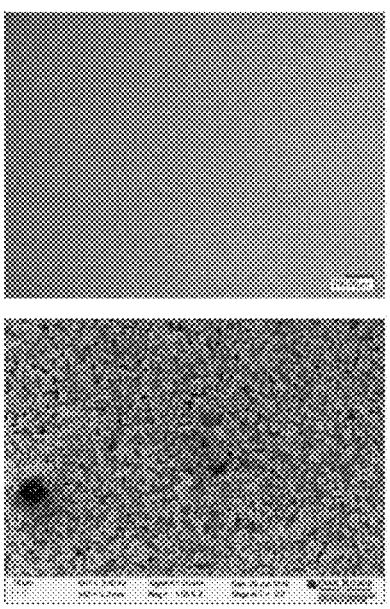
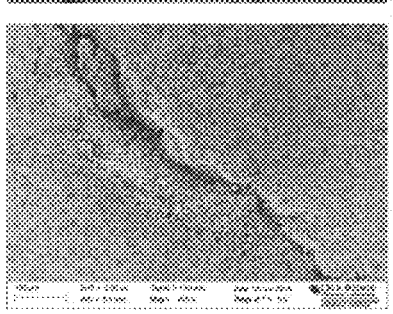
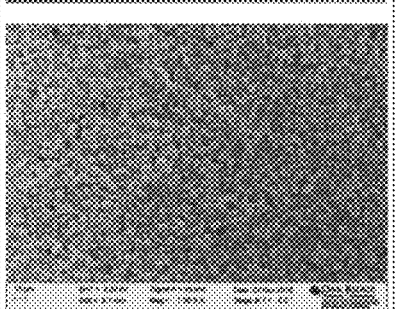
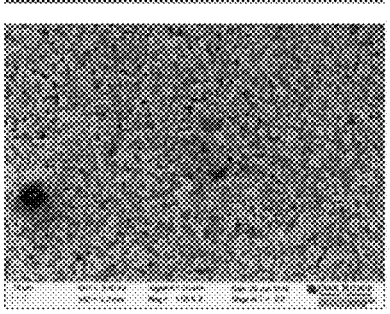
FIG. 4A     FIG. 4C     FIG. 4E
FIG. 4B     FIG. 4D     FIG. 4F

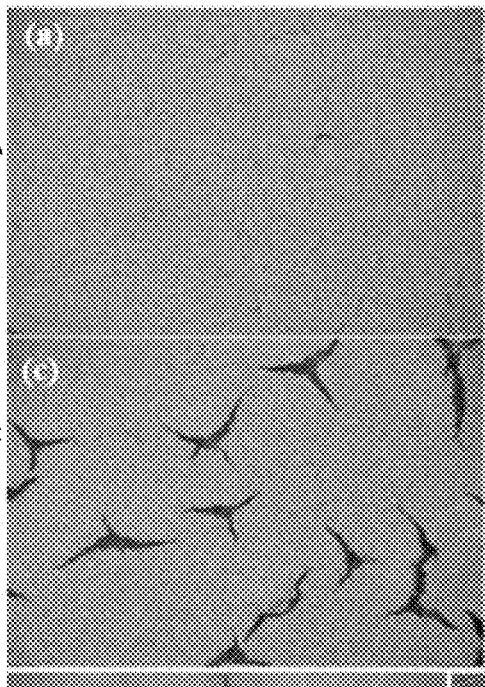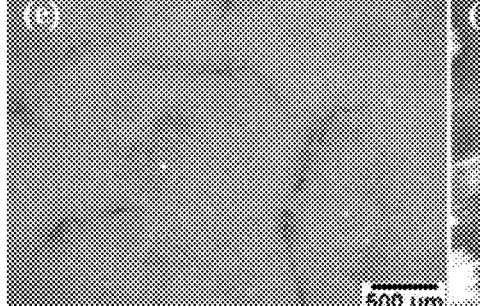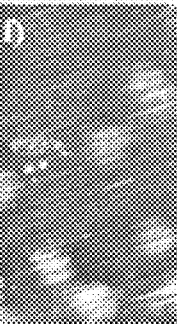
FIG. 6A FIG. 6B FIG. 6C FIG. 6D FIG. 6E FIG. 6F FIG. 6G

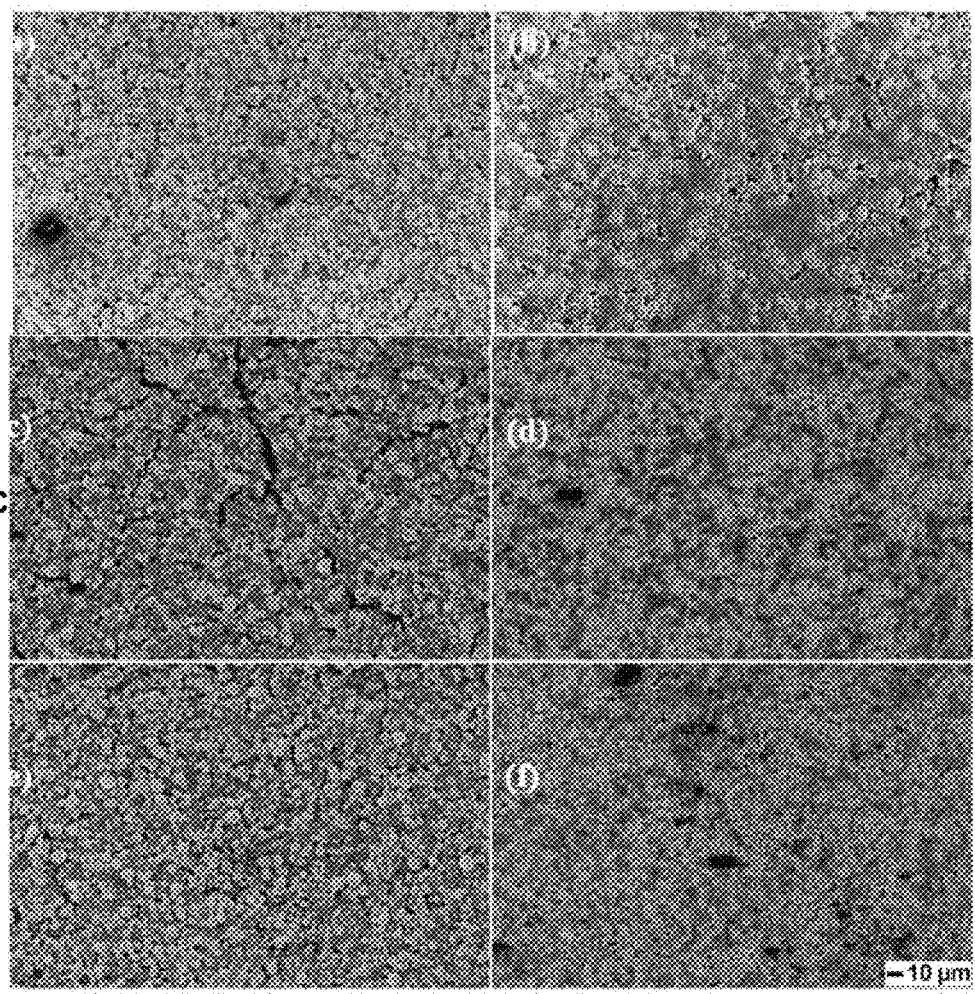

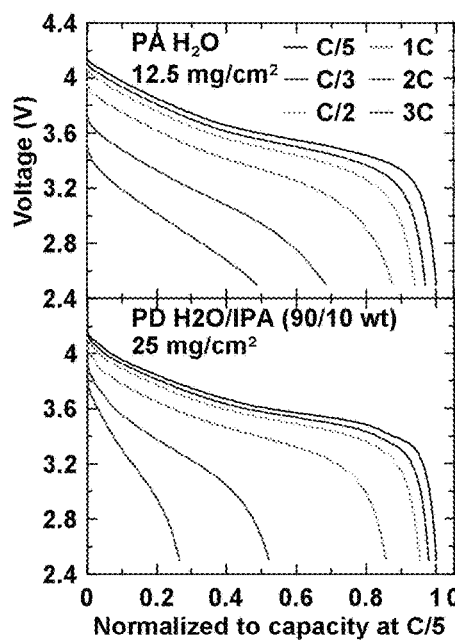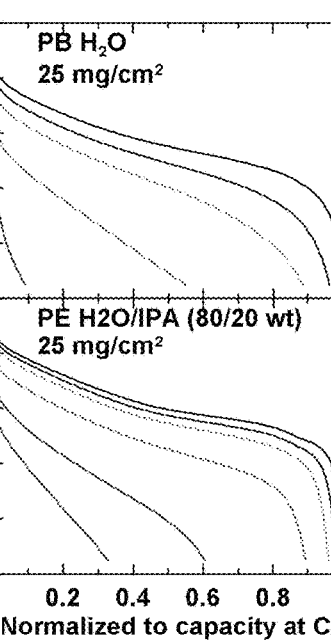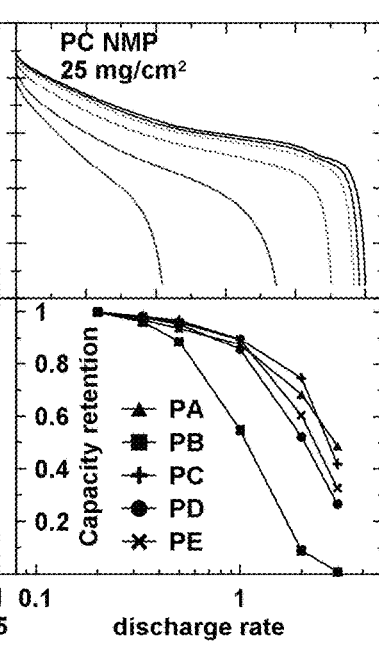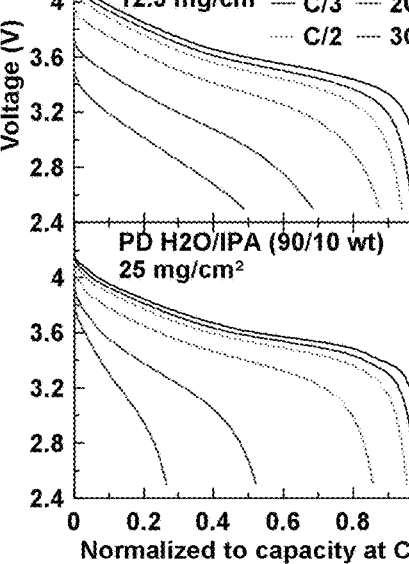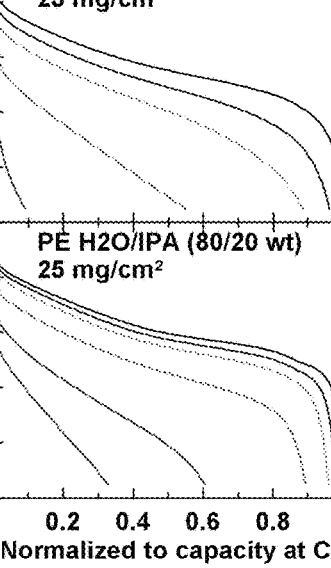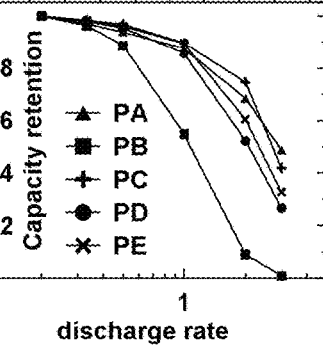
FIG. 10A  FIG. 10B  FIG. 10C
FIG. 10D  FIG. 10E  FIG. 10F

MANUFACTURING OF THICK COMPOSITE ELECTRODE USING SOLVENT MIXTURES

CROSS-REFERENCE TO RELATED APPLICATIONS

This application claims priority to U.S. Provisional Application No. 62/492,475 filed on May 1, 2017, entitled "MANUFACTURING OF THICK COMPOSITE ELECTRODE USING SOLVENT MIXTURES", the entire disclosure of which is incorporated herein by reference.

STATEMENT REGARDING FEDERALLY SPONSORED RESEARCH AND DEVELOPMENT

This invention was made with government support under Contract No. DE-AC05-00OR22725 awarded by the U.S. Department of Energy. The government has certain rights in this invention.

FIELD OF THE INVENTION

This invention relates generally to the manufacturing of electrodes, and more particularly to the manufacturing of thick electrodes with a reduction in the use of volatile organic compounds (VOC).

BACKGROUND OF THE INVENTION

Electrochemical energy storage and conversion devices including batteries, capacitors and fuel cells have found great utility in power sources for portable electronics, energy storage stations and electric vehicles. For example, the Li-ion battery is a device which has high energy/power density. The battery includes positive electrodes and negative electrodes that are electrically insulated by a porous separator. Electrolyte is filled in the pores of the electrodes and separators to ionically connect the two electrodes. The positive electrode and negative electrode are composed of lithium active solid particles which are held to a thin metal sheet by binders. The thin metal sheet is called a current collector. The binder is typically a polymer that provides adhesion of the solid particles to each other and to the current collector.

Li-ion batteries have received extensive research and development efforts for decades, which have resulted in continuous performance, durability, and safety advancements of this technology. However, further improvement in energy and power density and reduction in cost are needed to compete with the internal combustion engine driving range. In a Li-ion cell, both "active" and "inactive" components are used, and the "active" materials are compounds that can intercalate/de-intercalate lithium ions during charge and discharge. The active materials are typically lithium transition metal oxides for positive electrode and graphite for negative electrode. during charge and discharge. Other components in the complex Li-ion cell system are referred to as "inactive" materials because they do not contribute to the capacity of the cell. Decreasing the fraction of inactive components in Li-ion cells is a straightforward approach for much higher energy density. Electrode thickness and porosity are the critical engineering parameters that significantly influence overall battery performance. Thick positive electrodes of 100-200 μm are required for high-energy-density applications.

The electrode is manufactured via a slurry mixing, casting and drying processes. The solid particles and binder are dispersed into solvent such as water or N-Methyl-2-pyrrolidone (NMP) to form a semiliquid mixture (slurry). The coating is produced by applying the slurry onto a current collector and drying out of the solvent. There is growing interest in fabricating composite cathodes through aqueous processing to make the process more environmentally benign. The reduction of cell cost is also of critical importance in cell design. Polyvinylidene difluoride (PVDF) is the most widely used binder for positive composite electrodes, which is dissolved in the volatile, expensive, and toxic NMP solvent during electrode manufacturing. Therefore, efforts have been made to study alternative binders which are water soluble, such as carboxymethyl cellulose (CMC), polyacrylic latex, and acrylate polyurethane. It has been shown that processing cost can be decreased significantly when water-based manufacturing is used in conjunction with thick electrode designs.

If water is used, however, the electrodes develop cracks during drying and have high residual stress when increasing coating thickness. These electrodes have poor performance when utilized in alkali-ion secondary (rechargeable) batteries. Cracking and residual stress in the coating is related to the build-up of capillary pressure during the drying process. The development of cracks during drying has been extensively reported in other particulate compositions such as desiccated soil, concrete casting, ceramic films and colloidal dispersions. It has been generally accepted that capillary stresses generated during drying are the cause. Stress induced cracking has been experimentally investigated by a cantilever technique. When a wet coating containing suspended particles is dried, the air-liquid interface reaches the sediment surface during drying. The meniscus of the air-solvent interface between particles generates a capillary pressure, and this pressure increases as solvent evaporates, which exerts further compression force on the particles. Eventually, the coating cracks at certain critical points to release the drying stresses. Several studies have also introduced numerical simulation into the dynamic observation of capillary shrinkage cracking. The results of these simulations indicate that crack initiation is due to capillary forces.

It has also been observed that cracking occurs only above a critical coating thickness. The critical thickness was found to be independent of the drying speed, and it actually increased with particle size because the capillary pressure scaled inversely with the particle radius.

Cracking has not drawn attention in aqueous processed coatings for Li-ion batteries. It is well-known that the surface tension of water (72.80 mN/m, 20° C.) is much higher than NMP (40.79 mN/m, 20° C.). Therefore, higher capillary pressure is expected in the drying processes of aqueous slurries that would lead to coating cracking.

SUMMARY OF THE INVENTION

A method of making an electrode includes the step of dispersing an active electrode material and a conductive additive in a solvent to create a mixed dispersion. The solvent has a surface tension less than 40 mN/m and an ozone forming potential of no more than 1.5 lbs. ozone/lb. solvent. A surface of a current collector is treated to raise the surface energy of the surface to at least the surface tension of the solvent or the mixed dispersion. The dispersed active electrode material and conductive additive are deposited on the current collector. The coated surface is heated to remove solvent from the coating.

The solvent can be a solvent mixture comprising at least two miscible solvents. One of the solvents comprising the solvent mixture can be water. The solvent mixture can comprise is 5-25 wt. % solvent and 75-95% wt. water. The surface tension of the solvent can be less than 30 mN/m.

The solids loading can be greater than 60 wt. % based on the total weight of the mixed dispersion. The solids loading can be greater than 70 wt. % based on the total weight of the mixed dispersion.

The maximum thickness of the electrode can be determined by the equation:

$$h_{max} = 0.41\left(\frac{GM\emptyset_{rcp}R^3}{2\gamma}\right)1/2$$

where $h_{max}$ is the maximum thickness, G is the shear modulus of the particles, M is the coordination number, $\emptyset_{rcp}$ is the particle volume fraction at random close packing, R is the particle radius, and γ is the solvent-air interfacial tension. R can be between 5 and 20 microns.

The ozone forming potential of the solvent can be less than 1.1 lbs. ozone/lb. solvent. The ozone forming potential of the solvent can be less than 0.5 lbs. ozone/lb. solvent.

The solvent can be at least one selected from the group consisting of water, methyl acetate, parachlorobenzotrifluoride, tert-butyl acetate, acetone, heptane, isopropanol, methanol, n-butyl acetate, n-propyl acetate, cyclohexane, methyl ethyl ketone, and ethanol.

The active electrode material can be a cathode material. The cathode material can be at least one selected from the group consisting of $LiCoO_2$, $LiNiO_2$, $LiMnO_2$, $LiMn_2O_4$, $LiNi_xMn_{2-x}O_4$, $LiFePO_4$, $LiMnPO_4$, $LiCoPO_4$, $LiFe_xMn_{1-x}PO_4$, $LiNi_xMn_yCo_{1-x-y}O_2$, $Li_{1+x}Ni_yMn_zCo_{1-x-y-z}O_2$, $LiNi_xMn_yCo_zAl_{1-x-y-z}O_2$, $Li_{1+x}Ni_yMn_{1-x}Co_zO_2$, and $Cu_2ZnSn(S,Se)_4$.

The active electrode material can be an anode material. The anode material can be at least one selected from the group consisting of synthetic graphite particulate, natural graphite particulate, Si particle-C fiber nanocomposites, $LiTiO_2$, $Li_4Ti_5O_{12}$, Sn particulate, and Si particulate.

The conductive additive can be at least one selected from the group consisting of carbon black, graphite particulate, graphene, and carbon nanotubes.

An electrode made according to the method of the invention can have no crack with a major dimension greater than 200 microns. The electrode can be between 100 microns and 450 microns in thickness, at 20-40% porosity.

The method can further include the step of dispersing a binder with the active electrode material, conductive additive and solvent to create the mixed dispersion. The electrode can comprise 60-99.5 wt. % active electrode material, 0-20 wt. % conductive additive, and 0.5-20 wt. % binder, based on the total weight of the final electrode. The binder can be at least one selected from the group consisting of styrene butadiene rubber (SBR), carboxymethyl cellulose (CMC), xanthan gum, perfluorosulfonic acid (PFSA), fluorinated acrylates and polyvinylidene fluoride (PVDF).

The mixed dispersion can further include at least one dispersant. The method can further include the steps of measuring the zeta potential of the active electrode material and the conductive additive material prior to the dispersing step, and selecting a cationic or anionic dispersant based on the zeta potential, and determining the isoelectric point (IEP) of the active electrode material and the conductive additive material prior to the dispersing step. The method can also include the step of, if the isoelectric point (IEP) pH<6 and the operating pH>6 selecting a cationic dispersant, if IEP 6≤pH≤8, then selecting a cationic or anionic surfactant, and if IEP pH>8 and the operating pH<8 then selecting an anionic surfactant. The dispersed active electrode material and the dispersed conductive additive material can be separate suspensions, and the method can further include the step of combining the dispersed suspensions prior to the depositing step. The method can further include the step of measuring the zeta potential of the active electrode material and the conductive additive, and its respective dispersant, to verify zeta potential greater than +30 mV or less than −30 mV. The cationic dispersant can be polyethyleneimine (PEI), and the anionic dispersant can be polyacrylic acid (PAA).

The surface treatment step can include subjecting the surface of the current collector to at least one selected from the group consisting of a plasma treatment, laser treatment, wet chemical treatment, ion beam treatment, electron beam treatment, and thermal etching treatment. The plasma treatment can be a corona treatment. The heating step can be conducted at a temperature that is less than the boiling point of any individual solvent.

The dispersing step can include dispersing an active material in a solvent with at least one dispersant to create an active electrode material dispersion, dispersing a conductive additive in a solvent to create a conductive additive dispersion, and mixing the active electrode material dispersion with the conductive additive dispersion to create the mixed dispersion. The solvent for the active electrode material dispersion can be different from the solvent for the conductive additive dispersion. The method can further include the steps of measuring the zeta potential of each solvent mixture and, if the solvent mixture has an unstable zeta potential, adding a cationic or anionic dispersant until the solvent mixture acquires a predetermined rheological flow characteristic. The predetermined rheological flow characteristic can be the slope of a log-log plot of the shear stress as a function of shear rate. The method can include, if the slope is not between 0.9 and 1.1, the step of changing at least one of the dispersant or the concentration of the dispersant in the solvent mixture.

BRIEF DESCRIPTION OF THE DRAWINGS

There are shown in the drawings embodiments that are presently preferred it being understood that the invention is not limited to the arrangements and instrumentalities shown, wherein:

(FIG. 2B) liquid menisci formed as water evaporation; (FIG. 2C) crack initiation by the in-plane pressure; (FIG. 2D) crack propagation through the coating.

FIG. 4A-F is a depiction of coating morphology 25 mg/cm² for aqueous processing showing cracks at lower (FIG. 4A) and higher (FIG. 4B) magnification; for processing with H₂O (90 wt %)+Methyl Acetate (10 wt %) at lower (FIG. 4C) and higher (FIG. 4D) magnification; and for NMP (binder is PVDF) at lower (FIG. 4E) and higher (FIG. 4F) magnification.

FIG. 6A-D shows optical images of aqueous processed NMC532 electrodes with different areal loadings of 15 mg/cm$^2$ (FIG. 6A), 17.5 mg/cm$^2$ (FIG. 6B), 20 mg/cm$^2$ (FIG. 6C), and 25 mg/cm$^2$ (FIG. 6D). FIG. 6E shows the calendered electrode with 25 mg/cm$^2$ and FIG. 6F shows the back side of Al foil. FIG. 6G shows a photo of an electrode tearing apart during calendering.

FIG. 9A-F are SEM images of electrode morphologies manufactured via a slot-die coater using IPA/water mixtures as solvents with 25 mg/cm$^2$ loading, showing uncalendered (FIG. 9A) and calendered (FIG. 9B) electrode PC using NMP processing; uncalendered (FIG. 9C) and calendered (FIG. 9D) electrode PD using IPA/water 10/90 wt % processing; and uncalendered (FIG. 9E) and calendered (FIG. 9F) electrode PE using IPA/water 20/80 wt % processing.

FIG. 10 shows pouch cell discharge voltage curves at different C rates with electrode PA (FIG. 10A), electrode PB (FIG. 10B), electrode PC (FIG. 10C), electrode PD (FIG. 10D) and electrode PE (FIG. 10E) as positive electrodes. FIG. 10F illustrates capacity retention (normalized to capacity at C/5) at different discharge C rates.

DETAILED DESCRIPTION OF THE INVENTION

Figure 1:
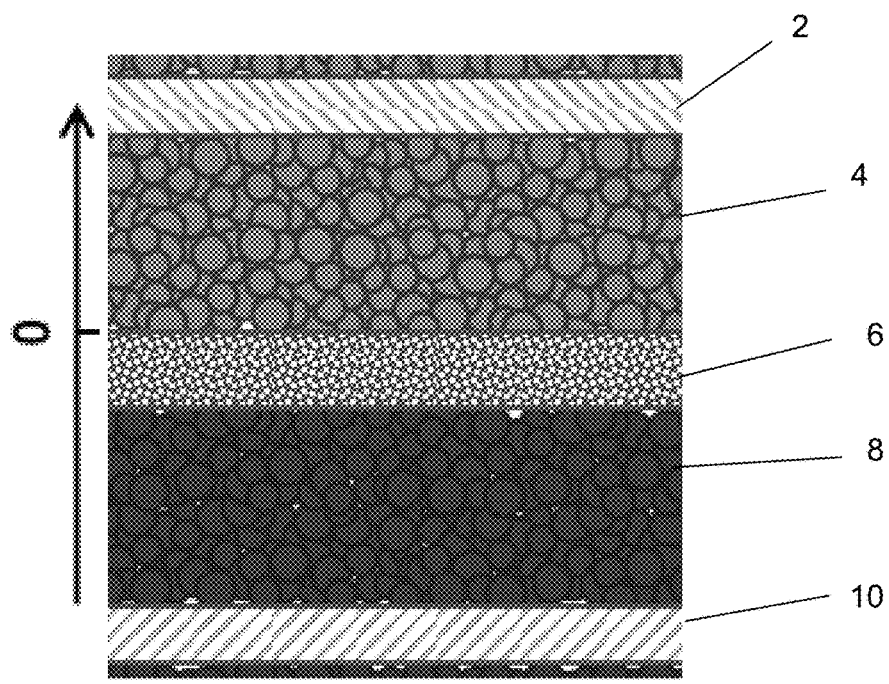
FIG. 1 is a schematic diagram of a battery electrode that can be formed by a process according to the invention.

A method of making an electrode includes the step of dispersing an active electrode material and a conductive additive in a solvent to create a mixed dispersion. The solvent has a surface tension less than 40 mN/m and an ozone forming potential of no more than 1.5 lbs. ozone/lb. solvent. A surface of a current collector is treated to raise the surface energy of the surface to at least the surface tension of the solvent or the mixed dispersion. The dispersed active electrode material and conductive additive are deposited on the current collector. The coated surface is heated to remove solvent from the coating.

The invention provides a solvent system with a surface tension less than water. The surface tension can be less than 40, 39, 38, 37, 36, 35, 34, 33, 32, 31, 30, 29, 28, 27, 26, 25, 24, 23, 22, 20, 19, or 18 mN/m. The surface tension of the solvent can be within a range of any high or low value selected from these values.

The solvent used in the slurry preparation is preferably a volatile organic carbon (VOC) exempt solvent. VOC exempt solvents do not require strict recovery processes and, as with water, the condensing recovery step is eliminated. Cost saving includes reducing capital investment and reduced energy input for solvent recovery. A recognized measure of VOC content is the ozone forming potential. The ozone forming potential of the solvent can be less than 1.1 lbs. ozone/lb. The ozone forming potential of the solvent can be less than 0.5 lbs. ozone/lb. solvent. The ozone forming potential can be less than 1.5, 1.4, 1.3, 1.2, 1.1, 1.0, 0.9, 0.8, 0.7, 0.6, and 0.5 lbs. ozone/lb. solvent, or within a range of any high or low value selected from these values. Compounds with from 0.5 to 0.0 lbs. ozone/lb. solvent are regarded by regulatory bodies such as the US Environmental Protection Agency (EPA) as "volatile organic compound (VOC) exempt.

The solvent can include at least one selected from the group consisting of water, methyl acetate, parachlorobenzotrifluoride, tert-butyl acetate, acetone, heptane, isopropanol, methanol, n-butyl acetate, n-propyl acetate, cyclohexane, methyl ethyl ketone, ethanol, and mixtures thereof. The ozone forming potential of these solvents is listed in Table 1:

TABLE 1

Ozone Forming Potential

| | | average Pounds/pounds |
|---|---|---|
| Methyl acetate | MeOAc | 0.1 |
| Parachlorobenzotrifluoride | PCBTF | 0.1 |
| tert-butyl acetate | tBAc | 0.2 |
| Acetone | Ace | 0.3 |
| heptane | heptane | 0.6 |
| Isopropanol | IPA | 0.6 |
| Methanol | MeOH | 0.7 |
| n-butyl acetate | nBuAc | 0.9 |
| n-Propyl acetate | nPrAc | 1.0 |
| cyclohexane | cyhex | 1.3 |
| Methyl Ethyl Ketone | MEK | 1.3 |
| ethanol | 5OH | 1.3 |

Other solvents are possible, including solvents with higher ozone forming potentials if a solvent recovery step is utilized. The solvent can be a solvent mixture comprising at least two miscible solvents. One of the solvents comprising the solvent mixture can be water. The solvent mixture can comprise 5-25 wt. % solvent and 75-95% wt. % water. Also, it is possible to mix a higher ozone forming potential solvent with a lower ozone forming solvent so long as the mixture has an acceptable total ozone forming potential, for example below 1.5 lbs. ozone/lb. solvent.

The active electrode material can be any suitable cathode material. The cathode material can be, without limitation, at least one selected from the group consisting of $LiCoO_2$, $LiNiO_2$, $LiMnO_2$, $LiMn_2O_4$, $LiNi_xMn_{2-x}O_4$, $LiFePO_4$, $LiMnPO_4$, $LiCoPO_4$, $LiFe_xMn_{1-x}PO_4$, $LiNi_xMn_yCo_{1-x-y}O_2$, $Li_{1+x}Ni_yMn_zCo_{1-x-y-z}O_2$, $LiNi_xMn_yCo_zAl_{1-x-y-z}O_2$, $Li_{1+x}Ni_yMn_{1-x}Co_zO_2$, and $Cu_2ZnSn(S,Se)_4$.

The active electrode material can be any suitable anode material. The anode material can be, without limitation, at least one selected from the group consisting of synthetic graphite particulate, natural graphite particulate, Si particle-C fiber nanocomposites, $LiTiO_2$, $Li_4Ti_5O_{12}$, Sn particulate, and Si particulate.

The conductive additive can be any suitable conductive additive. The conductive additive can be at least one selected from the group consisting of carbon black, graphite particulate, graphene, and carbon nanotubes.

The invention reduces or eliminates cracking. The invention can provide an electrode can having no crack with a major dimension greater than 200 microns. This allows for thicker electrodes. The electrode can be between 100 microns and 450 microns in thickness, at 20-40% porosity. The electrode can be 100, 125, 200, 225, 250, 275, 300, 325, 350, 375, 400, 425, and 450 microns, or within a range of any high or low value selected from these values. The porosity can be 20, 21, 22, 23, 24, 25, 26, 27, 28, 29, 30, 31, 32, 33, 34, 35, 36, 37, 38, 39 and 40%, or within a range of any high or low value selected from these values.

An equation (Equation (1)) which was developed by others relates the critical thickness to several physical-chemical properties and has been confirmed by experimental observation. The maximum thickness of the electrode can be determined by the equation (1):

$$h_{max} = 0.41\left(\frac{GM\phi_{rcp}R^3}{2\gamma}\right)^{1/2} \quad (1)$$

where $h_{max}$ is the maximum thickness, G is the shear modulus of the particles, M is the coordination number, $\phi_{rcp}$ is the particle volume fraction at random close packing, R is the particle radius, and γ is the solvent-air interfacial tension, and wherein R is between 5 and 20 microns. The parameter that is addressed by the invention is γ, the interfacial tension.

The method can further include the step of dispersing a binder with the active electrode material, conductive additive and solvent to create the mixed dispersion. The electrode can include 60-99.5 wt. % active electrode material, 0-20 wt. % conductive additive, and 0.5-20 wt. % binder, based on the total weight of the final electrode. The solids loading can be greater than 60 wt. % based on the total weight of the mixed dispersion. The solids loading can be greater than 70 wt. % based on the total weight of the mixed dispersion.

The binder can be any suitable binder. The binder can be at least one selected from the group consisting of styrene butadiene rubber (SBR), carboxymethyl cellulose (CMC), xanthan gum, perfluorosulfonic acid (PFSA), fluorinated acrylates and polyvinylidene fluoride (PVDF).

The mixed dispersion can further include at least one dispersant. The method can further include the step of measuring the zeta potential of the active electrode material and the conductive additive material prior to the dispersing step, and selecting a cationic or anionic dispersant based on the zeta potential, and determining the isoelectric point (IEP) of the active electrode material and the conductive additive material prior to the dispersing step, wherein if the isoelectric point (IEP) pH<6 and the operating pH>6 selecting a cationic dispersant, if IEP 6≤pH≤8, then selecting a cationic or anionic surfactant, and if IEP pH>8 and the operating pH<8 then selecting an anionic surfactant. Such dispersions are described in U.S. Pat. No. 8,956,688 (Feb. 17, 2015), the disclosure of which is incorporated fully by reference.

The dispersed active electrode material and the dispersed conductive additive material can be separate suspensions. The method can further include the step of combining the dispersed suspensions prior to the depositing step. The method can further include the step of measuring the zeta potential of the active electrode material and the conductive additive, and its respective dispersant, to verify zeta potential greater than +30 mV or less than −30 mV. The cationic dispersant can be polyethyleneimine (PEI), and the anionic dispersant can be polyacrylic acid (PAA).

The surface treatment step can include subjecting the surface of the current collector to at least one selected from the group consisting of a plasma treatment, laser treatment, wet chemical treatment, ion beam treatment, electron beam treatment, and thermal etching treatment. The plasma treatment can be a corona treatment.

The dispersing step can be dispersing an active material in a solvent with at least one dispersant to create an active electrode material dispersion, dispersing a conductive additive in a solvent to create a conductive additive dispersion, and mixing the active electrode material dispersion with the conductive additive dispersion to create the mixed dispersion. The solvent for the active electrode material dispersion can be different from the solvent for the conductive additive dispersion. The method can further include the steps of measuring the zeta potential of each solvent mixture and, if the solvent mixture has an unstable zeta potential, adding a cationic or anionic dispersant until the solvent mixture acquires a predetermined rheological flow characteristic. The predetermined rheological flow characteristic can be the slope of a log-log plot of the shear stress as a function of shear rate. If the slope is not between 0.9 and 1.1, the method can further include the step of changing at least one of the dispersant or the concentration of the dispersant in the solvent mixture.

A method of making a battery electrode includes the steps of dispersing an active electrode material and a conductive additive in solvent mixture (water and VOC exempt solvent); treating a surface of a current collector to raise the surface energy of the surface above the surface tension of at least one of water and the mixed dispersion; depositing the dispersed active electrode material and conductive additive on a current collector; and heating the coated surface to remove solvent from the coating.

The dispersed active electrode material and the dispersed conductive additive material can be separate suspensions. The dispersed suspensions can be combined prior to the depositing step. The method can include the step of dispersing at least one binder material with the at least one dispersant.

The heating step can be conducted at a temperature that is less than the boiling point of any individual solvent. The heating step can comprise a multistage heating with different temperatures.

The electrochemical performance of electrodes formed according to the invention was evaluated in pouch cells and compared with the electrodes with aqueous processed electrodes. Electrodes processed with solvent mixture in this invention exhibited similar rate performance, internal resistance, and cycling performance compared to conventional N-Methyl-2-pyrrolidone (NMP) processed electrodes.

FIG. 1 is a schematic diagram of an example of a thick electrode to achieve high energy density that can be formed by the present invention. The invention can be utilized to formulate electrodes with many different compositions. Thicker electrodes can decrease the proportion of inactive components in the cell stack, such as current collector and separator. It can also reduce the battery cost by reducing handling/processing steps. The electrode shown in FIG. 1 as an example, and without limitation, includes an Al foil current collector 2 that is 15 μm thick. An NCA cathode 4, with 70 vol % NCA is provided with thickness 150-200 microns. A separator 6 is 20 μm thick. An graphite anode 8 (70 vol %) is 150-200 microns thick. The anode current collector 10 is Cu foil that is 15 um thick.

Figures 2A, 2B, 2C, 2D:
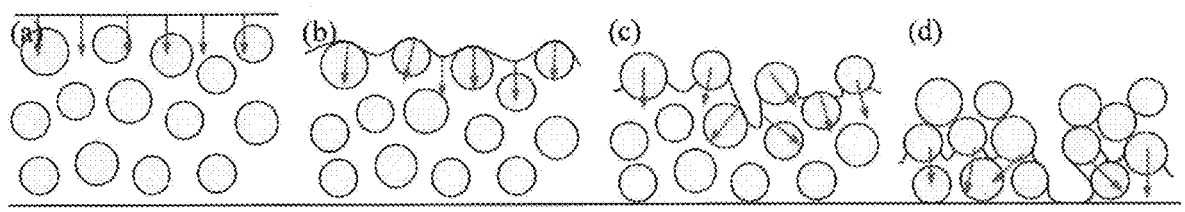
FIG. 2A-D is a sequential illustration of the drying process showing (FIG. 2A) slurry cast on Al foil.

FIG. 2 is an illustration of the drying process that results in cracking. FIG. 2A shows a slurry cast on Al foil. FIG. 2B shows liquid menisci formed as water evaporation. FIG. 2C shows crack initiation by the in-plane pressure. FIG. 2D shows crack propagation through the coating. Initially (FIG. 2A), all particles are suspended in the solvent after the slurry is cast onto Al foil. As the solvent evaporates, the air-solvent interface reaches the sediment surface (FIG. 2B). Menisci are formed between particles on the surface and particles are subjected to a compressive force perpendicular to the air-liquid interface resulting from capillary pressure. As particles consolidate further (FIG. 2C), capillary pressure builds up and local gaps widen due to the in-plane components with increasing capillary forces. Eventually (FIG. 2D), the film cracks to release stress. Calendaring does not solve this problem.

Aqueous processing in particular has cracking issues when applied to form thick electrodes. Capillary pressure accumulated during drying is the reason for cracking initiation and propagation. The invention provides other solvents added into the formulation to solve the cracking issue by reducing surface tension. VOC exempt solvents such as methyl acetate are practical for thick electrodes in terms of electrode integrity and rate performance. VOC exempt solvents do not require adding the solvent recovery step during drying, retaining the advantage of aqueous processing over NMP processing.

Figure 3:
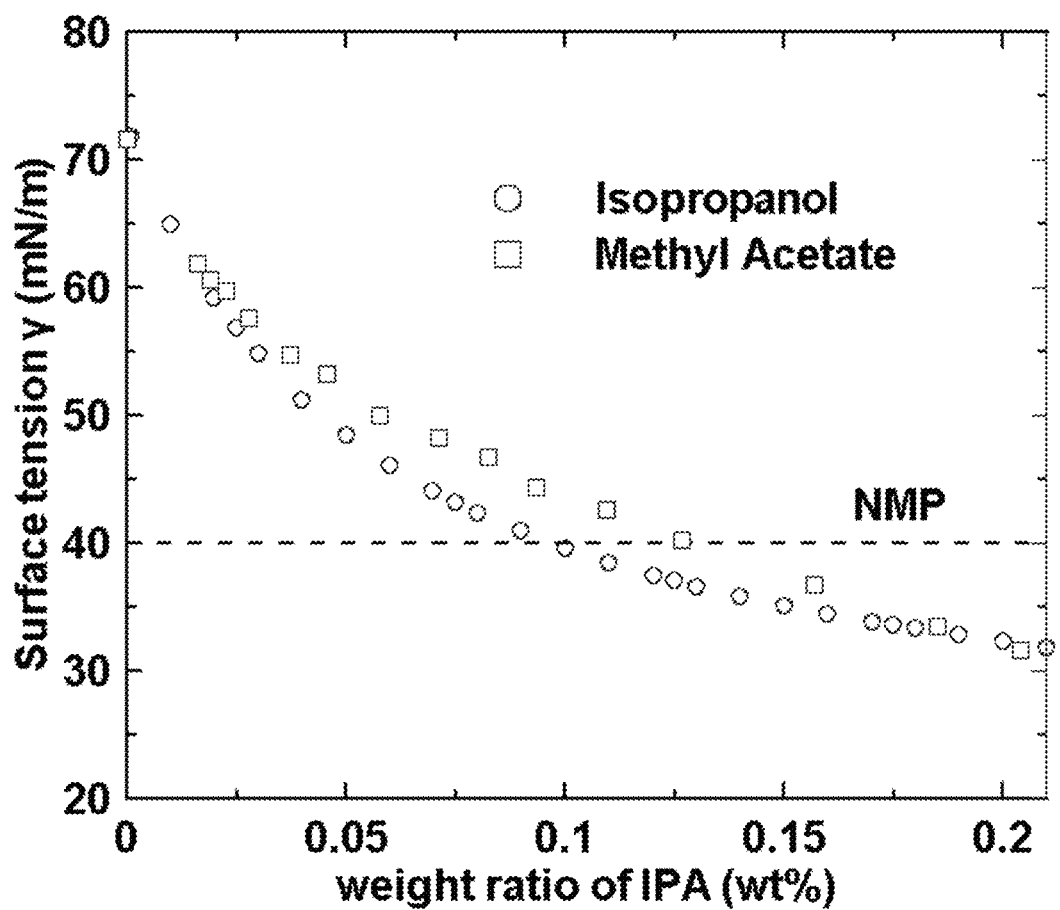
FIG. 3 is a plot of surface tension γ (mN/m) vs. weight ratio IPA (wt %) for isopropanol, methyl acetate, and a reference for NMP.

FIG. 3 is a plot of surface tension versus γ (mN/m) weight ratio of IPA (wt. %) for isopropanol, methyl acetate and NMP. Surface tension reduction takes place with increasing IPA content. FIG. 3 demonstrates that the use of a co-solvent is effective to lower the surface tension of water, and that common coating solvents can be utilized to form mixtures with water for surface tension reduction. Mixtures can for example include IPA/water, methyl acetate/water, heptane/water, and acetone/water.

EXAMPLES

FIG. 4A-F is a depiction of coating morphology 25 mg/cm$^2$ for aqueous processing showing cracks at lower (FIG. 4A) and higher (FIG. 4B) magnification; for processing with H$_2$O (90 wt %)+Methyl Acetate (10 wt %) at higher (FIG. 4C) and lower (FIG. 4D) magnification; and for NMP (binder is PVDF) at lower (FIG. 4E) and higher (FIG. 4F) magnification. The images taken from aqueous processing shown in FIG. 4A and FIG. 4B show significant cracking. The images taken for electrodes formed by a solvent system according to the invention using H$_2$O (90 wt %)+methyl acetate (10 wt %), FIG. 4C and FIG. 4D, show little or no cracking. A comparison with an electrode formed with NMP is shown in FIG. 4E and FIG. 4F, which also shows little or no cracking.

Figure 5:
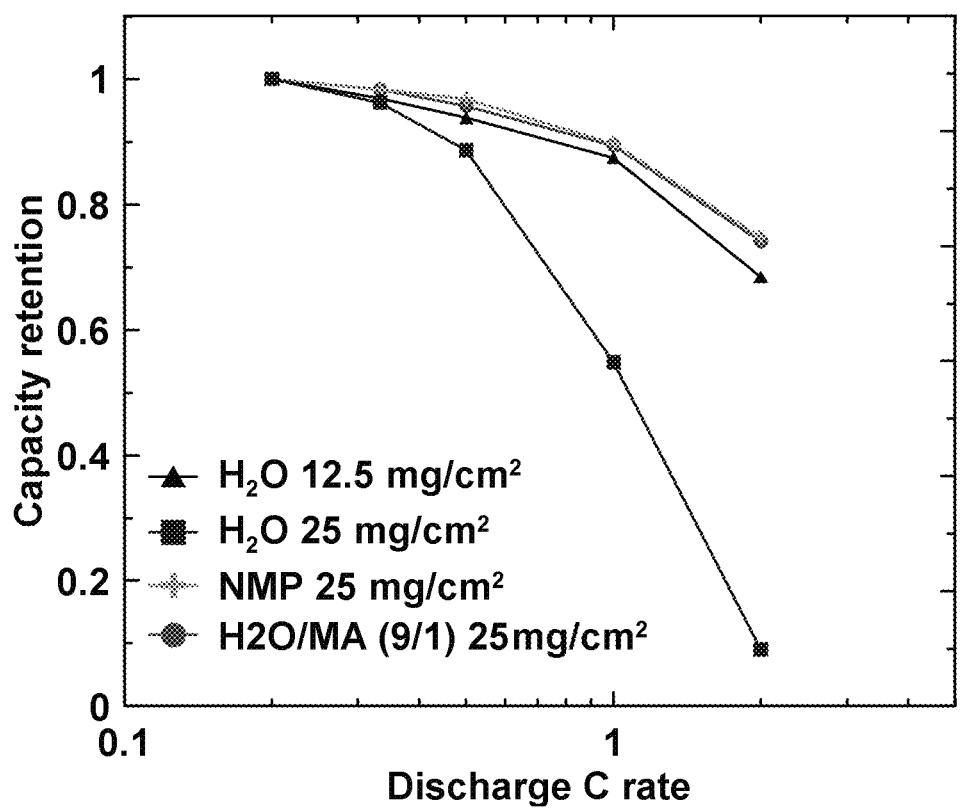
FIG. 5 is a plot of capacity retention vs. discharge C rate for $H_2O$ 12.5 mg/cm$^2$; $H_2O$ 35 mg/cm$^2$; NMP 25 mg/cm$^2$; and $H_2O$/MA (9/1) 25 mg/cm$^2$.

FIG. 5 is a plot of capacity retention vs. discharge C rate for H$_2$O 12.5 mg/cm$^2$; H$_2$O 35 mg/cm$^2$; NMP 25 mg/cm$^2$; and H$_2$O/MA (9/1) 25 mg/cm$^2$. FIG. 5 illustrates cell rate performance, and that the cracked electrode has poor rate capacity retention. The rate performance for 25 mg/cm$^2$ processed with NMP or according to the invention with H$_2$O/MA (9/1) are as good as each other.

The processing and characterization of aqueous processed electrodes with high areal loading and associated full pouch cell performance was investigated. The surface tension of water was reduced by the addition of isopropyl alcohol (IPA), which led to improved wettability and decreased capillary pressure during drying. The critical thickness (areal loading) without cracking increased gradually with increasing IPA content. Cracking of the electrode coatings becomes a critical issue for aqueous processing of the positive electrode as areal loading increases above 20-25 mg/cm$^2$ (~4 mAh/cm$^2$). The electrochemical performance was evaluated in pouch cells.

Doctor-blade coating. LiNi$_{0.5}$Mn$_{0.3}$Co$_{0.2}$O$_2$ (NMC532, Toda America) and carbon black (Li-100, Denka) were used as active material and conductive additive, respectively. CMC (Ashland) and acrylic emulsion polymer (Ashland) were used as binder in a fixed 1/4 wt % ratio. The slurry was prepared in high-shear mixer (NETZSCH Premier Technologies) with solid components (total weight of 60 grams) of NMC532/carbon black/binder=90/5/5 wt %. The solvents used in the slurry preparation were H$_2$O (100%), H$_2$O/IPA (93/7 wt %), H$_2$O/IPA (90/10 wt %), H$_2$O/IPA (88/12 wt %), H$_2$O/IPA (85/15 wt %) and H$_2$O/IPA (80/20 wt %) respectively. The slurry was applied to Al foil manually using a doctor-blade with various gap thicknesses (for different areal loadings) in the DOE Battery Manufacturing R&D Facility at ORNL (BMF) dry room (relative humidity of 0.1-0.2%).

Optical observation of drying process. The doctor-blade produced coating was placed immediately under an optical microscope (VHX-5000, Keyence). The morphology was observed with elapsed time under room temperature (20° C.) in the same dry room (RH 0.1-0.2%).

Contact angle measurement. H$_2$O/IPA mixtures with IPA wt % ranging from 0 to 20% with 2.5% intervals were prepared. Contact angles of the mixed solvent on Al foil were measured using a goniometer (Model 260-F4, Ramé-Hart Instrument Co.)

Slot-die coating. Two slurries were prepared in a planetary mixer (Ross, PDM ½) with solid components (total weight of 600 grams) of NMC532/carbon black/binder=90/5/5 wt %. The solvents used in the slurry preparation were H$_2$O/IPA (90/10 wt %) and H$_2$O/IPA (80/20 wt %) respectively. The slurries were degassed at 20 in Hg vacuum for 30 minutes. Then electrodes were fabricated by applying the slurry to a 15 μm thick Al foil on a slot-die coater (Frontier Industrial Technology, Inc.) with areal loading of 25 mg/cm$^2$ after drying as listed in Table 2.

SEM observation: Electrode morphology was characterized by a scanning electron microscope (SEM, Carl Zeiss Merlin) under different magnifications.

Pouch cell assembly. The pouch cell stacks (two-electrode unit cells) consisted of one layer of negative electrode (86.4 mm×58 mm), one layer of positive electrode (84.4 mm×56 mm), and a layer of separator (89 mm×61 mm, Celgard 2325). The electrolyte used in the pouch cell was 1.2 M UPF$_6$ in ethylene carbonate (EC)/ethyl methyl carbonate (EMC) (3/7 by weight). Cell assembly was carried out in the DOE Battery Manufacturing R&D Facility at ORNL (BMF) dry room with a dew point of less than −40° C. and relative humidity (RH) of 0.1%.

TABLE 2

| NMC532 composite electrodes. | | |
| --- | --- | --- |
| Electrode name | Solvent in processing | Loading (mg/cm$^2$) |
| PA | H$_2$O | 12.3 |
| PB | H$_2$O | 25.1 |
| PC | NMP | 24.5 |
| PD | H$_2$O/IPA (90/10 wt %) | 25.4 |
| PE | H$_2$O/IPA (80/20 wt %) | 25.3 |

Cell performance testing. The pouch cells were cycled between 2.5 and 4.2 V via a Maccor Series 4000 Automated Test System at 30° C. A charging and discharging rate of C/20 (with C/50 trickle charge) was used for the four formation cycles. A C/3 rate with C/10 trickle charge was used for the cycling performance test. Rate performance was tested within the voltage window of 2.5-4.2V at C/20, C/10, C/5, C/3, C/2, 1 C, and 2 C discharge rates with constant charging rate of C/5. A rest time of 5 minutes was used before each charge and discharge step. For the hybrid pulse power characterization (HPPC) tests, the resistance of cells was measured at every 10% depth-of-discharge (DOD), and was composed of sets of a discharge pulse at 2 C for 10 sec followed by a rest for 40 sec and a regeneration (charge) pulse at 1.5 C for 10 sec followed by a rest for 40 sec. The resistance was calculated by using current and voltage differences before and after the HPPC discharge pulses.

Aqueous processing of thick NMC532 positive electrode is challenged by cracking evolution during electrode drying. There is shown in FIG. 6 optical images of aqueous processed NMC532 electrodes with different areal loadings: (a) 15 mg/cm$^2$, (b) 17.5 mg/cm$^2$, (c) 20 mg/cm$^2$ and (d) 25 mg/cm$^2$. FIG. 6 shows the dried electrodes with increasing areal loading from 15 mg/cm$^2$ to 25 mg/cm$^2$. The electrode with 15 mg/cm$^2$ loading (FIG. 6A) was uniform and crack-free, but noticeable cracks with gap width of 50 μm and length of 300 μm were observed in the electrode with 17.5 mg/cm$^2$ loading (FIG. 6B). Further crack propagation is seen in FIG. 6C and FIG. 6D for increased areal loading in the manner of both crack quantity and crack dimension (width and length). For the 25 mg/cm$^2$ loading (FIG. 6D, electrode PB), the cracks propagated through the coating surface to the current collector. Calendering has been shown to improve the coating quality and FIG. 6E shows an optical image of electrode PB after calendering. The cracks diminished in size but could not be fully eliminated. The nominal porosity measured from coating thickness was found to be as high as 50%. The backside image of the Al foil after calendering is shown in FIG. 6F. These shiny white spots indicate these areas were over-calendered due to the uneven distribution of materials and have a very low "local" porosity compared to cracked regions. The cracks in the coating also led to tearing of the Al foil when passing through the calendering machine as shown in FIG. 6G.

Figure 7:
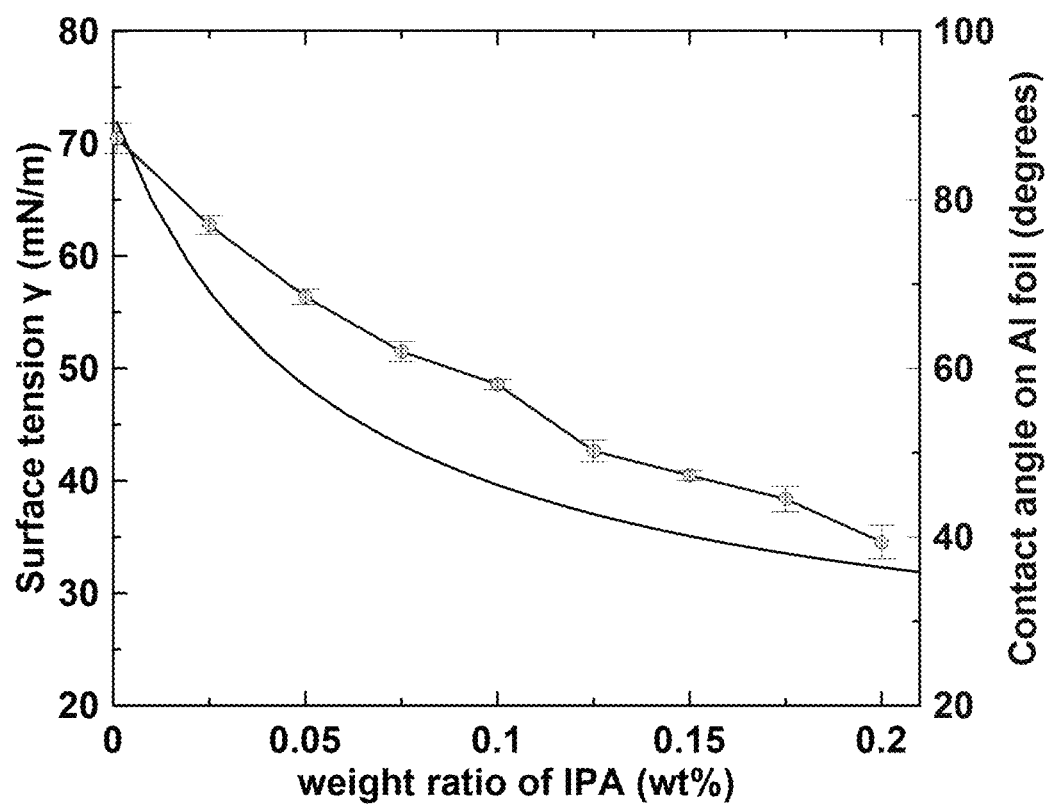
FIG. 7 is a plot of calculated surface tension γ (mN/m) of IPA-water mixture versus composition, and the measured contact angle between Al foil and the mixed solvent.

Since the capillary pressure during drying initiates film cracking, the reduction of surface tension is a straightforward method to alleviate or eliminate cracks. IPA is a widely used solvent in the industry with a very low surface tension (23.00 mN/m, 20° C.) and it is also miscible with water. The surface tension of binary mixtures of water and IPA has also been studied previously. An equation has been derived by Connors and Wright relating the surface tension to the composition of IPA-water in Equation (2):

$$\gamma = \gamma_1 - \left[1 + \frac{0.970 x_1}{1 - 0.984 x_1}\right] x_2 (\gamma_1 - \gamma_2) \quad (2)$$

where $x_1$ is the mole fraction of water and $x_2$ is the mole fraction of IPA. $y_1$ is the surface tension of water and $y_2$ is the surface tension of IPA. FIG. 7 shows how the surface tension changes with the weight ratio of IPA in the mixture. This rapid decrease with increasing IPA content is typical for the aqueous systems with surface-active solutes. Calculated surface tension of IPA-water mixture versus composition, and measured contact angle between Al foil and the mixed solvent.

With the decrease in surface tension, the contact angle of IPA-water mixtures on Al foil also decreases. The contact angle using 20 wt % IPA in water is around 39.4° (with a surface tension of 32.3 mN/m) which is very close to that using NMP on Al foil (34.3°). The decreasing contact angle indicates the gradual improvement in the wettability of the solvent on Al foil. It has also been reported that surface tension lower than the surface energy of Al foil (47.9 mJ/m$^2$) promotes adhesion between coating and current collector.

Figure 8:
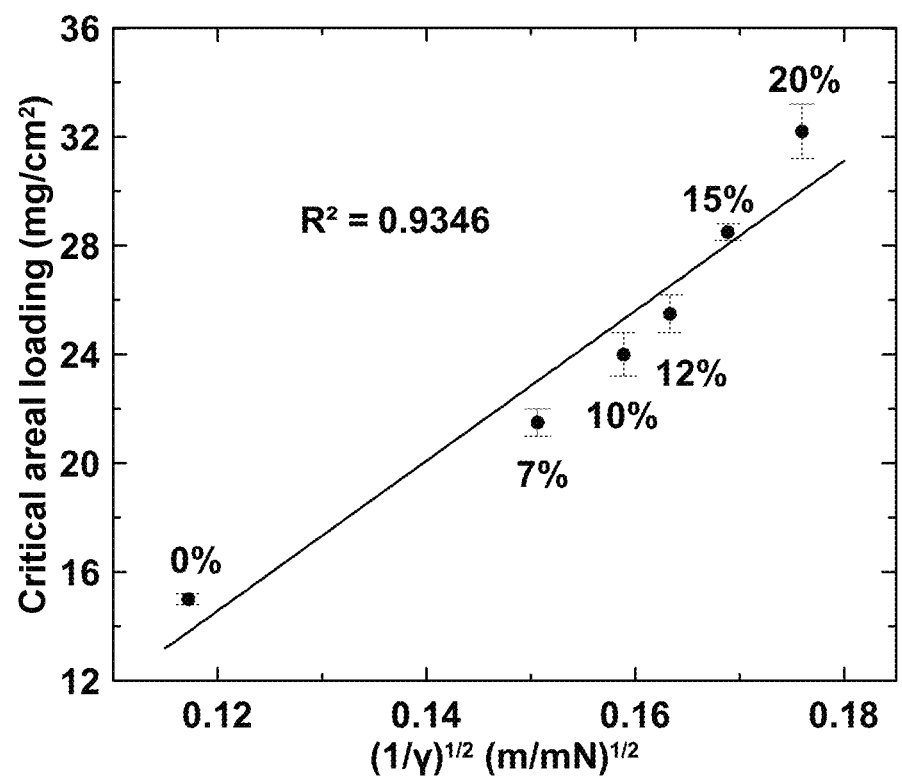
FIG. 8 is a plot of critical areal loading (mg/cm$^2$) of NMC532 composite electrode versus $(1/\gamma)^{1/2}$ (m/mN)$^{1/2}$. The composition of solvent is indicated with IPA content in the figure.

Several slurries using different IPA/water mixtures as solvent were cast onto Al foil and dried at room temperature in the dry room. The critical thickness/loading of the coating without cracking versus the solvent composition is shown in FIG. 8. FIG. 8 shows the critical areal loading of NMC532 composite electrode versus $(1/\gamma)^{1/2}$. The composition of solvent is indicated with IPA content in the figure. The crack-free loading increases gradually when more IPA was used in the slurry preparation. This is attributed to the reduced surface tension which led to decreased capillary forces during coating drying. A linear relationship is obtained between the critical loading and $(1/\gamma)^{1/2}$ with R$^2$ coefficient of determination of 0.9346. This is in good agreement with prediction. Slurries were prepared with the same composition of NMC532, carbon black particles and binder. Therefore, all the physical-chemical properties in Equation (1) remain the same except the surface tension ($\gamma$) of the solvent. This figure suggests the minimum required amount of IPA to manufacture crack-free NMC532 composite electrodes for a certain thickness.

FIG. 9 shows the electrode morphologies manufactured via the ORNL slot-die coater using IPA/water mixtures as solvents with 25 mg/cm$^2$ loading. FIG. 9 is SEM images of electrodes manufactured using IPA/water mixtures: (FIG. 9A) uncalendered and (FIG. 9B) calendered electrode PC using NMP processing; (FIG. 9C) uncalendered and (FIG. 9D) calendered electrode PD using IPA/water 10/90 wt % processing; (FIG. 9E) uncalendered and (FIG. 9F) calendered electrode PE using IPA/water 20/80 wt % processing. The electrodes processed using PVDF/NMP (electrode PC) are shown in FIG. 9A and FIG. 9B before and after calendaring, showing good structural quality without any cracks. In FIG. 9C (electrode PD), small cracks with width less than 10 μm are observed across the coating surface, indicating the capillary pressure from 10 wt % IPA can still initiate cracking during solvent drying. However, the calendered electrode PD (FIG. 9D) shows these cracks are completely closed in response to the applied force. For electrode PE (FIG. 9E and FIG. 9F), no cracks were observed after drying, which is in accordance with the small-scale doctor-blade coating study. The NMC532 and carbon black particles are well dispersed in all electrodes. Alcohol has been reported to improve the dispersion of particles in coating manufacturing. However, it was observed similar dispersion in the electrode regardless of whether water, IPA/water mixtures or NMP were used as solvent. This finding could be due to the large scale of mixtures (total weight of solid components 600 grams) in this study compared to less than 1 gram in prior experiments, which introduces more variables during manufacturing.

The electrochemical performance was evaluated using pouch cells, which were made using the slot-die coated electrodes paired with a graphite electrode. FIG. 10 shows pouch cell discharge voltage curves at different C rates with (FIG. 10A) electrode PA, (FIG. 10 B) electrode PB, (FIG. 10C) electrode PC, (FIG. 10D) electrode PD and (FIG. 10E) electrode PE as positive electrodes. FIG. 10F shows capacity retention (normalized to capacity at C/5) at different discharge C rates. FIGS. 10A-E show the cell voltage curves under different discharge C rates from C/5 to 2 C. For electrode PA (FIG. 10A), the capacity decreased gradually with increasing C rate, which was fairly satisfactory up to 3 C. For electrode PB (FIG. 10B), the capacity decreased rapidly with increasing C-rate. The cells could not deliver any appreciable capacity when discharged at 2 C and 3 C. The low rate performance suggests the cells have very high internal resistance, which is in line with its poor structural integrity. When the electrode quality is improved for thick electrode PC, PD and PE, good capacity retention is shown in FIG. 10C, FIG. 10D, and FIG. 10E. The polarization for aqueous processed electrodes (PA, PD and PE) all have greater polarization compared to NMP processed electrode PC. It has been shown that the exposure of NMC materials to moisture leads to surface delithiation and formation of lithium carbonate. As a result, the aqueous processed electrodes have slightly higher resistance from the surface layer of lithium carbonate, leading to the higher voltage polarization. In-situ coating of NMC particles is a possible method to keep the active materials such as NMC from direct contact with water and enables aqueous processing of cathodes for Li-ion cells.

The normalized capacity retention versus discharge C rate is shown in FIG. 10F. Compare to other electrodes, the capacity retention for electrode PB deteriorates significantly when the discharge C rate was higher than C/2 due to the poor quality of the coating. With the reduction of solvent surface tension during manufacturing, coatings with good quality were formulated and thus the capacity retention was improved for electrode PD and PE. The capacity retention of electrode PD and PE is slightly lower than electrode PC at 2 C and 3 C. This is attributed to extra resistance from the surface layer of lithium carbonate when NMC532 is exposed in water as discussed above.

Figure 11:
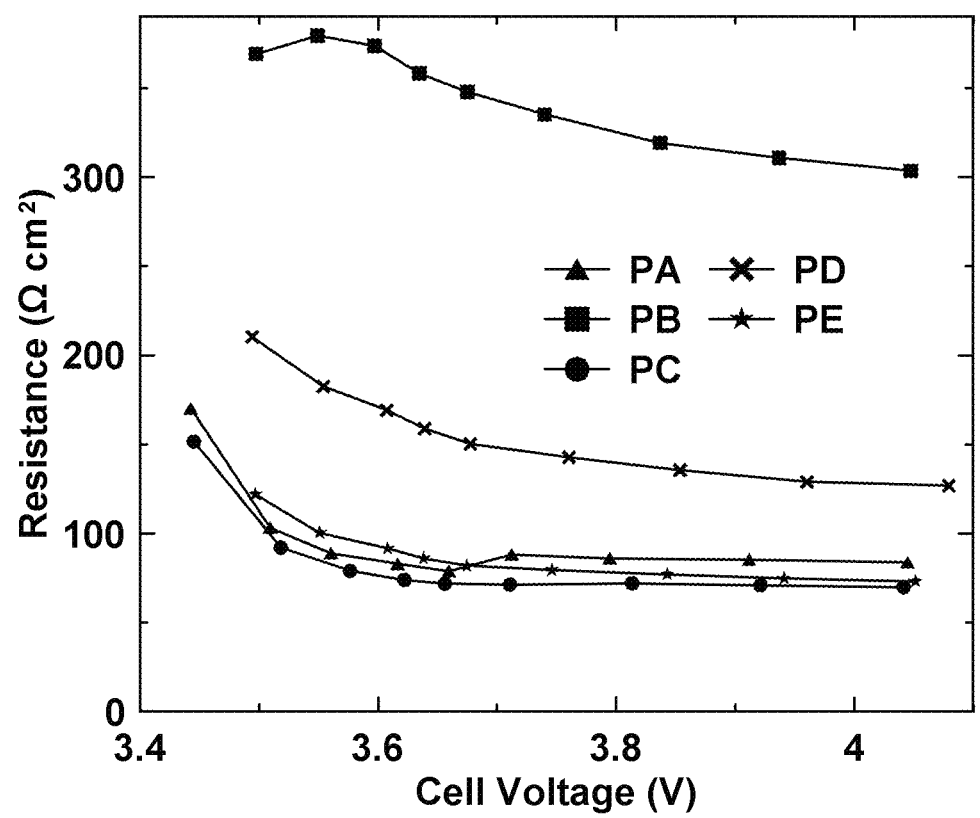
FIG. 11 shows resistance (Ω cm$^2$) versus cell voltage (V) for different positive electrodes.

The electrode resistances from HPPC testing are shown in FIG. 11. With the reduction of cracking/interfacial phenomena in coating manufacturing, the internal resistance decreased greatly from electrode PB to electrode PD and even further to electrode PE for aqueous processing. For example, the resistance at about 50% DOD was 150.2 Ω-cm$^2$ for electrode PD compared to 347.9/296.5 Ω-cm$^2$ for electrode PB. The resistance for electrode PE (81.8 Ω-cm$^2$) was similar to electrode PA (78.8 Ω-cm$^2$) and electrode PC (65.3 Ω-cm$^2$). The internal resistance analysis was in agreement with the rate performance of the electrode. The small cracks observed in electrode PD after drying may have led to some interfacial resistance after calendering, although this resistance is much less than electrodes PB. Therefore, electrode PD shows slightly higher internal resistance than electrode PE which was uniform and crack-free both before and after calendering. It suggests that pre-existing cracks, which can be diminished by calendering, can still result in additional internal resistance in the electrode.

Figure 12:
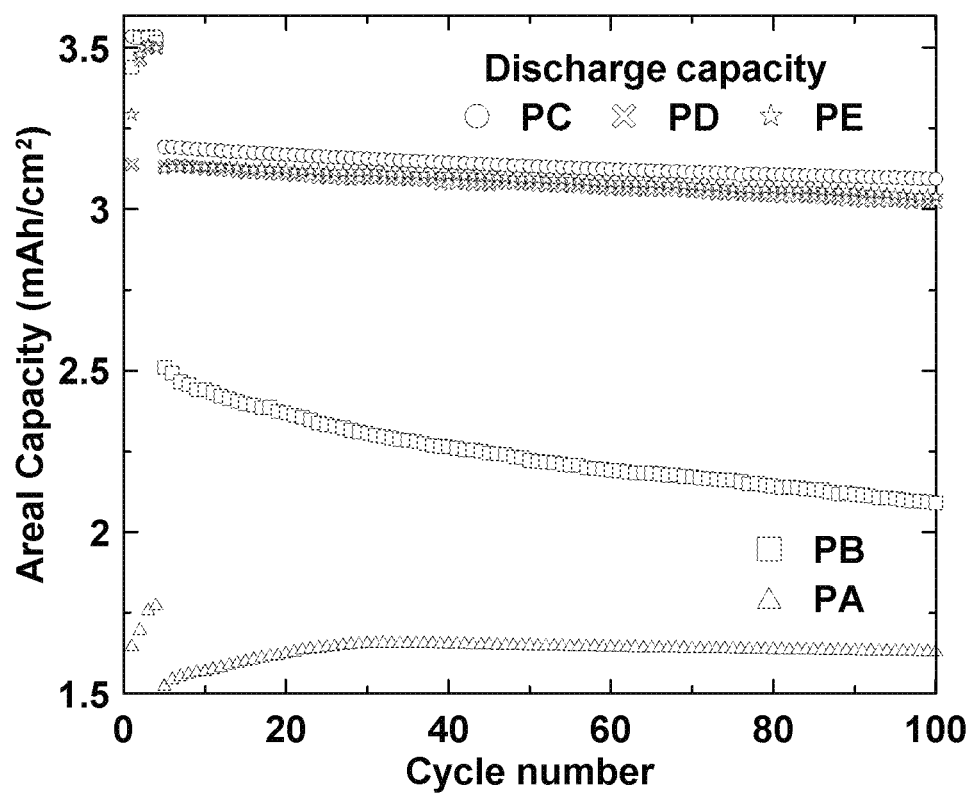
FIG. 12 is a plot of areal capacity (mAh/cm$^2$) versus cycle number for different positive electrodes.

The pouch cell cycling performance using different electrodes is shown in FIG. 12. FIG. 12 shows cycling performance of Li-ion cells using different positive electrodes. C/20 for the first four cycles and C/3 for the following cycles. With the addition of IPA during formulation, electrodes PD and PE show much improved capacity and cycling performance compared to aqueous processed electrodes PB. Electrode PE has a capacity retention (100th cycle compared to 5th cycle, same below) of 97.3% and electrode PD has capacity retention of 96.4%, which are comparable to 97.0% for NMP processed electrode PC. This finding is expected from the good morphology and physical integrity of electrodes PD and PE which eliminates the detrimental interfacial resistances from the cracks in electrode PB.

The surface tension of the solvent was reduced by adding IPA during slurry preparation, alleviating the residual stress. The critical cracking thickness of the coating was increased with increasing IPA content due to the decreased surface tension. Two exemplary coatings processed with water/IPA weight ratio of 90/10 and 80/20 were prepared with 25 mg/cm$^2$ loading resulted in only small cracks observed in the former coating while no cracks were observed in the latter coating. The elimination of cracks in the latter coating resulted in reduced internal resistance in the electrode. The water/IPA (80/20 wt) processed electrode showed comparable rate performance and cycling performance to the NMP processed electrode.

Aqueous processing of electrodes according to the invention promises to reduce cost due to the elimination of the toxic solvent N-Methyl-2-pyrrolidone (NMP), resolving the issue of cracking by using solvent mixtures including water, acetone, methyl acetate, and other Volatile organic compounds (VOC) exempt solvent. When the solvent mixtures are used in the manufacturing, the surface tension is reduced. Residual stress in the electrode is reduced and a reduced number of cracks or no cracks are formed during drying.

This invention can be embodied in other forms without departing from the spirit or essential attributes thereof and accordingly reference should be make to the appended claim to assess the scope of the invention.

We claim:

1. A method of making an electrode, comprising the steps of:
    dispersing an active electrode material and conductive additive particles in a solvent mixture comprising at least two miscible solvents to create a mixed dispersion, the solvent mixture having a surface tension less than 40 mN/m and an ozone forming potential of no more than 1.5 lbs. ozone/lb solvent;
    treating a surface of a current collector to raise the surface energy of the surface to at least the surface tension of the solvent mixture or the mixed dispersion;
    depositing the dispersed active electrode material and conductive additive on the current collector; and,
    heating the coated surface to remove solvent from the coating;
    wherein the maximum thickness of the electrode is:

$$h_{max} = 0.41 \left( \frac{GM\emptyset_{rcp}R^3}{2\gamma} \right)^{1/2}$$

where $h_{max}$ is the maximum thickness, G is the shear modulus of the particles, M is the coordination number, $\emptyset_{rcp}$ is the particle volume fraction at random close packing, R is the particle radius and is between 5 and 20 microns, and γ is the solvent-air interfacial tension.

2. The method of claim 1, wherein the at least two miscible solvents of the solvent mixture are selected from the group consisting of water, methyl acetate, parachlorobenzotriflouride, tert-butyl acetate, acetone, heptane, isopropanol, methanol, n-butyl acetate, n-propyl acetate, cyclohexane, methyl ethyl ketone, ethanol, and mixtures thereof.

3. The method of claim 1, wherein the surface tension of the solvent mixture is less than 30 mN/m.

4. The method of claim 1, wherein the solids loading is greater than 60 wt. % based on the total weight of the mixed dispersion.

5. The method of claim 1, wherein the solids loading is greater than 70 wt. % based on the total weight of the mixed dispersion.

6. The method of claim 1, wherein the ozone forming potential of the solvent mixture is less than 1.1 lbs. ozone/lb solvent.

7. The method of claim 1, wherein the ozone forming potential of the solvent mixture is less than 0.5 lbs. ozone/lb solvent mixture.

8. The method of claim 1, wherein one of the at least two miscible solvents comprising the solvent mixture is water, and the other of the at least two miscible solvents comprises at least one selected from the group consisting of, methyl acetate, parachlorobenzotrifluoride, tert-butyl acetate, acetone, heptane, isopropanol, methanol, n-butyl acetate, n-propyl acetate, cyclohexane, methyl ethyl ketone, and ethanol.

9. The method of claim 1, wherein the active electrode material is a cathode material.

10. The method of claim 9, wherein the cathode material is at least one selected from the group consisting of $LiCoO_2$, $LiNiO_2$, $LiMnO_2$, $LiMn_2O_4$, $LiNi_xMn_{2-x}O_4$, $LiFePO_4$, $LiMnPO_4$, $LiCoPO_4$, $LiFe_xMn_{1-x}PO_4$, $LiNi_xMn_yCo_{1-x-y}O_2$, $Li_{1+x}Ni_yMn_zCo_{1-x-y-z}O_2$, $LiNi_xMn_yCo_zAl_{1-x-y-z}O_2$, $Li_{1+x}Ni_yMn_{1-x}Co_zO_2$, and $Cu_2ZnSn(S,Se)_4$.

11. The method of claim 1, wherein the active electrode material is an anode material.

12. The method of claim 11, wherein the anode material is at least one selected from the group consisting of synthetic graphite particulate, natural graphite particulate, Si particle-C fiber nanocomposites, $LiTiO_2$, $Li_4Ti_5O_{12}$, Sn particulate, and Si particulate.

13. The method of claim 1, wherein the conductive additive is at least one selected from the group consisting of carbon black, graphite particulate, graphene, and carbon nanotubes.

14. The method of claim 1, wherein the electrode has no crack with a major dimension greater than 200 microns.

15. The method of claim 1, wherein the electrode is between 100 microns and 450 microns in thickness, at 20-40% porosity.

16. The method of claim 1, further comprising the step of dispersing a binder with the active electrode material, conductive additive and solvent to create the mixed dispersion.

17. The method of claim 16, wherein the electrode comprises 60-99.5 wt. % active electrode material, 0-20 wt. % conductive additive, and 0.5-20 wt. % binder, based on the total weight of the final electrode.

18. The method of claim 16, wherein the binder is at least one selected from the group consisting of styrene butadiene rubber (SBR), carboxymethyl cellulose (CMC), xanthan gum, perfluorosulfonic acid (PFSA), fluorinated acrylates and polyvinylidene fluoride (PVDF).

19. The method of claim 1, wherein the mixed dispersion further comprises at least one dispersant.

20. The method of claim 19, further comprising the step of measuring the zeta potential of the active electrode material and the conductive additive material prior to the dispersing step, and selecting a cationic or anionic dispersant based on the zeta potential, and determining the isoelectric point (IEP) of the active electrode material and the conductive additive material prior to the dispersing step, wherein if the isoelectric point (IEP) pH<6 and the operating pH>6 selecting a cationic dispersant, if IEP 6≤pH≤8, then selecting a cationic or anionic surfactant, and if IEP pH>8 and the operating pH<8 then selecting an anionic surfactant.

21. The method of claim 20, wherein the dispersed active electrode material and the dispersed conductive additive material are separate suspensions, and further comprising the step of combining the dispersed suspensions prior to the depositing step.

22. The method of claim 21, further comprising the step of measuring the zeta potential of the active electrode material and the conductive additive, and its respective dispersant, to verify zeta potential greater than +30 mV or less than −30 mV.

23. The method of claim 20, wherein the cationic dispersant is polyethyleneimine (PEI), and the anionic dispersant is polyacrylic acid (PAA).

24. The method of claim 1, wherein the surface treatment step comprises subjecting the surface of the current collector to at least one selected from the group consisting of a plasma treatment, laser treatment, wet chemical treatment, ion beam treatment, electron beam treatment, and thermal etching treatment.

25. The method of claim 24, wherein the plasma treatment is a corona treatment.

26. The method of claim 1, wherein the dispersing step comprises dispersing an active material in a solvent with at least one dispersant to create an active electrode material dispersion, dispersing a conductive additive in a solvent to create a conductive additive dispersion, and mixing the active electrode material dispersion with the conductive additive dispersion to create the mixed dispersion.

27. The method of claim 26, wherein the solvent for the active electrode material dispersion is different from the solvent for the conductive additive dispersion.

28. The method of claim 26, further comprising the steps of measuring the zeta potential of each solvent mixture and, if the solvent mixture has an unstable zeta potential, adding a cationic or anionic dispersant until the solvent mixture acquires a predetermined rheological flow characteristic.

29. The method of claim 28, wherein the predetermined rheological flow characteristic is the slope of a log-log plot of the shear stress as a function of shear rate.

30. The method of claim 29, wherein if the slope is not between 0.9 and 1.1 further comprising the step of changing at least one of the dispersant or the concentration of the dispersant in the solvent mixture.

31. The method of claim 1, wherein the heating step is conducted at a temperature that is less than the boiling point of any individual solvent.

* * * * *